(12) United States Patent
Stählin

(10) Patent No.: US 8,364,986 B2
(45) Date of Patent: Jan. 29, 2013

(54) IDENTIFICATION-DEPENDENT COMMUNICATION BETWEEN VEHICLES

(75) Inventor: Ulrich Stählin, Eschborn (DE)

(73) Assignee: Continental Teves AG & Co. oHG (DE)

(*) Notice: Subject to any disclaimer, the term of this patent is extended or adjusted under 35 U.S.C. 154(b) by 362 days.

(21) Appl. No.: 12/676,718

(22) PCT Filed: Sep. 4, 2008

(86) PCT No.: PCT/EP2008/061696
§ 371 (c)(1),
(2), (4) Date: Mar. 5, 2010

(87) PCT Pub. No.: WO2009/030729
PCT Pub. Date: Mar. 12, 2009

(65) Prior Publication Data
US 2010/0313017 A1    Dec. 9, 2010

(30) Foreign Application Priority Data

| Sep. 5, 2007 | (DE) | 10 2007 042 031 |
| Dec. 11, 2007 | (DE) | 10 2007 059 831 |
| Sep. 3, 2008 | (DE) | 10 2008 045 467 |

(51) Int. Cl.
*H04L 29/00* (2006.01)
(52) U.S. Cl. ................ 713/193; 713/168
(58) Field of Classification Search .......... 713/193, 713/168
See application file for complete search history.

(56) References Cited

U.S. PATENT DOCUMENTS

| 5,622,064 | A | * | 4/1997 | Gluskoter et al. .......... 70/14 |
| 5,999,623 | A | * | 12/1999 | Bowman et al. .......... 380/239 |
| 6,204,774 | B1 | * | 3/2001 | Miwa et al. .......... 340/5.2 |
| 2004/0056770 | A1 | * | 3/2004 | Metcalf .......... 340/574 |
| 2004/0095230 | A1 | * | 5/2004 | Li et al. .......... 340/426.16 |
| 2004/0128062 | A1 | * | 7/2004 | Ogino et al. .......... 701/200 |
| 2004/0138809 | A1 | * | 7/2004 | Mukaiyama .......... 701/200 |
| 2004/0228490 | A1 | | 11/2004 | Klemba et al. |
| 2004/0236499 | A1 | * | 11/2004 | Watanabe .......... 701/200 |
| 2005/0003844 | A1 | * | 1/2005 | Nishiga et al. .......... 455/517 |
| 2005/0256614 | A1 | | 11/2005 | Habermas |
| 2006/0009906 | A1 | | 1/2006 | Hellmich et al. |
| 2006/0125655 | A1 | * | 6/2006 | McMahon .......... 340/907 |
| 2006/0291482 | A1 | | 12/2006 | Evans |
| 2007/0113070 | A1 | * | 5/2007 | Lackritz .......... 713/151 |
| 2007/0124046 | A1 | * | 5/2007 | Ayoub et al. .......... 701/36 |

FOREIGN PATENT DOCUMENTS

| EP | 1 672 854 A1 | 6/2006 |
| JP | 2005-241373 | 9/2005 |
| JP | 2006107013 A | * 4/2006 |

* cited by examiner

*Primary Examiner* — Michael Pyzocha
(74) *Attorney, Agent, or Firm* — RatnerPrestia

(57) ABSTRACT

A method and assistance system drawn to identification-dependent communication that takes place between vehicles. The messages to be transmitted are encrypted by cryptographic methods, wherein the necessary keys for the cryptographic methods are stored in vehicle components which are protected from unauthorized removal and installation by means of protection mechanisms. The method and system make it possible to limit standardized broadcasts to a particular group of users.

16 Claims, 2 Drawing Sheets

IDENTIFICATION-DEPENDENT COMMUNICATION BETWEEN VEHICLES

CROSS REFERENCE TO RELATED APPLICATIONS

This application is the U.S. national phase application of PCT International Application No. PCT/EP2008/061696, filed Sep. 4, 2008, which claims priority to German Patent Application No. 10 2007 042 031.7, filed Sep. 5, 2007, German Patent Application No. 10 2007 059 831.0, filed Dec. 11, 2007, and German Patent Application No. 10 2008 045 467.2, filed Sep. 3, 2008, the contents of such applications being incorporated by reference herein.

FIELD OF THE INVENTION

The invention relates to assistance technology for vehicles. In particular, the invention relates to an assistance system for a vehicle, a vehicle having such an assistance system, a method for identification-dependent communication between vehicles, a program element and a computer-readable medium.

BACKGROUND OF THE INVENTION

Radio communication between individual vehicles which takes place in the form of a general broadcast involves all the vehicles which are in range being addressed simultaneously. In other words, all the vehicles can communicate with all the other vehicles.

If the communication is intended to take place only between certain vehicles, it is possible to select a respective one of the particular vehicles individually. In this case, the communication is then between precisely two vehicles.

If the vehicle-to-vehicle communication is intended to take place between a multiplicity of vehicles, however, with some vehicles not belonging to said group of particular vehicles, it is necessary to find another solution.

SUMMARY OF THE INVENTION

It is an object of the invention to provide improved vehicle-to-vehicle communication.

The invention specifies an assistance system for a vehicle, a vehicle having such an assistance system, a method for identification-dependent communication between vehicles, a program element and a computer-readable medium.

The exemplary embodiments described relate in equal measure to the assistance system, the vehicle, the method, the program element and the computer-readable medium. In other words, the features subsequently cited in respect of the assistance system can also be implemented in the method, the vehicle, the program element or the computer-readable medium, and vice versa.

In line with one exemplary embodiment of the invention, an assistance system for a first vehicle is specified, wherein the assistance system has a communication device and also a restriction device. The communication device is used for communication with selected transmission and reception devices. These may be vehicles and/or mobile transmission and reception devices, such as a mobile telephone, which are adjacent to the first vehicle.

The restriction device is designed to restrict the communication to the selected transmission and reception devices. The restriction device or at least a fundamental portion thereof is integrated in a vehicle component of the assistance system, said vehicle component having a protection mechanism which protects the vehicle component from unauthorized removal and installation in the assistance system.

In other words, it is possible for the communication signals to be transmitted as a broadcast and hence, in principle, to be received by all the vehicles which are positioned in range. However, each vehicle contains a restriction device which ensures that only the vehicles which have actually been selected are able to be involved in the communication. This selection can be made by the user, for example, or else by the manufacturer. In particular, the selection can be set externally by a control center during the operation of the assistance system, for example using a radio transmission link.

On the one hand, it is possible for the signal transmitted by the vehicle or mobile appliance to have been modified by the restriction device such that it can be read only by the selected vehicles. This can be done using an appropriate decryption algorithm, for example, which encrypts the data to be transmitted such that only selected receivers can decrypt them. On the other hand, it is alternatively possible for the data to admittedly be able to be read by any receiver, in principle, but for the restriction device to recognize whether the received data are intended for the receiver. Only if the restriction device recognizes that the data are actually intended for this receiver does it release the data for further handling or for reproduction.

By way of example, the restriction device may be a piece of cryptographic software. It is also possible for the restriction device to be merely a database with the individual keys for the transmitters and receivers, which are sorted according to different groups, for example. Naturally, the restriction device may also have an appropriate piece of hardware which is designed to perform the encryption and decryption.

As an alternative or in addition to encryption of the data, it is also possible for the data to be authenticated, so that the receiver can establish whether it is the "required" receiver.

In line with the further exemplary embodiment of the invention, the selected transmission and reception devices are assistance systems which are arranged in vehicles (202) adjacent to the first vehicle (201).

In line with a further exemplary embodiment of the invention, the selected transmission and reception devices have a mobile communication appliance which is designed to support the assistance system (100).

In line with a further exemplary embodiment of the invention, the restriction device has an encryption device which is designed to encrypt data which are to be transmitted and to decrypt received data, wherein the keys required for the encryption and decryption are stored in the restriction device.

In line with a further exemplary embodiment of the invention, the restriction device or the keys required for the encryption and decryption is/are integrated in an ESP controller or in a driver assistance unit. The keys or other software or hardware components required for handling the data which are to be transmitted or which are received may also be integrated in other units, such as in an airbag controller, steering electronics, a central chassis controller for performing driving dynamics tasks, an engine controller, a gearbox controller, a suspension and/or shock-absorber controller, a (central) gateway, a driving authorization controller, a controller for am ambient sensor or directly in an ambient sensor, etc.

In this way, it is possible to ensure that the vehicle cannot readily be retrofitted with a corresponding restriction device. This means that it is possible to reduce the risk of misuse.

In line with a further exemplary embodiment of the invention, the vehicle component in which the restriction device is integrated is in the form of a separate, standalone module.

By way of example, this module can be permanently connected, e.g. welded, to the vehicle frame, for example at a location which is accessible only with very great difficulty.

In line with a further exemplary embodiment of the invention, the assistance system has an input device which can be used to select the vehicles which are intended to be involved in the communication.

In this way, the user (driver) himself can determine which vehicles are intended to be involved in the communication. By way of example, it is possible for the driver to create particular user groups between which he can select. Each user group is then provided with a dedicated key or a dedicated key pair in order to encrypt and decrypt the messages as appropriate.

In line with a further exemplary embodiment of the invention, the selected vehicles are vehicles from a particular manufacturer, vehicles in a particular class or vehicles in a particular model.

In line with a further exemplary embodiment of the invention, the selected vehicles are emergency vehicles, rescue vehicles, or are vehicles for short-distance public transport.

The relevant groups of vehicles which are involved can be defined by the actual manufacturer when the assistance system is manufactured.

In line with one exemplary embodiment of the invention, it is not possible for these groups to be subsequently changed by a user. This further reduces the risk of misuse.

In line with a further exemplary embodiment of the invention, the communication unit is designed for communication using Bluetooth, ZigBee, WLAN, WiMax, DSRC or cellular radio (GPRS, UMTS, LTE, etc.).

It is also possible to use other transmission protocols. The cited protocols afford the advantage of standardization already having taken place.

In line with a further exemplary embodiment of the invention, a vehicle having an assistance system as described above is specified.

By way of example, the vehicle is a motor vehicle, such as a car, bus or heavy goods vehicle, or else is a rail vehicle, a ship, an aircraft, such as a helicopter or airplane, or is a motor cycle.

In line with a further exemplary embodiment of the invention, a method for identification-dependent communication between vehicles or between a vehicle and a mobile appliance is specified in which data are received from a transmitting vehicle or appliance and it is then established whether the transmitting vehicle (or mobile appliance) is a vehicle (or mobile appliance) which belongs to a selected group of vehicles (or mobile appliances). This is established by accessing a vehicle component of an assistance system in the receiving vehicle, said vehicle component having a protection mechanism which protects the vehicle component from unauthorized removal and installation in the assistance system.

In line with a further exemplary embodiment of the invention, a method for identification-dependent communication between components of a vehicle is specified in which data are received from a transmitting component in the vehicle by another component in the vehicle and it is then established whether the transmitting component is a component which belongs to the group of components which are authorized for transmission. It is therefore possible to establish whether a component has been replaced retrospectively (sometimes without authorization). This requires every affected component to have a dedicated restriction unit. A list of possible components which are suitable for this purpose comprises the aforementioned controllers. By way of example, establishing the above involves accessing a vehicle component of an assistance system in the receiving vehicle, said vehicle component having a protection mechanism which protects the vehicle component from unauthorized removal and installation in the assistance system.

In line with a further exemplary embodiment of the invention, it is established whether the transmitting vehicle is a vehicle which belongs to a selected group of vehicles on the basis of a cryptographic method, wherein the keys required for the cryptographic method are stored in the vehicle component.

In other words, fundamental program elements are integrated or installed in a protected area which cannot readily be replaced or retrofitted.

In line with a further exemplary embodiment of the invention, a program element is specified which, when executed on the processor, instructs the processor to perform the method steps specified above.

In this case, the program element may be part of a piece of software which is stored on a processor in the assistance system, for example. The processor may likewise be the subject matter of the invention. In addition, this exemplary embodiment of the invention comprises a program element which uses the invention right from the outset, and also a program element which prompts an existing program to use the invention by virtue of an update.

In line with a further exemplary embodiment of the invention, a computer-readable medium is specified which stores the program element which, when executed on a processor, instructs the processor to perform the method steps specified above.

Exemplary embodiments of the invention are described below with reference to the figures.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
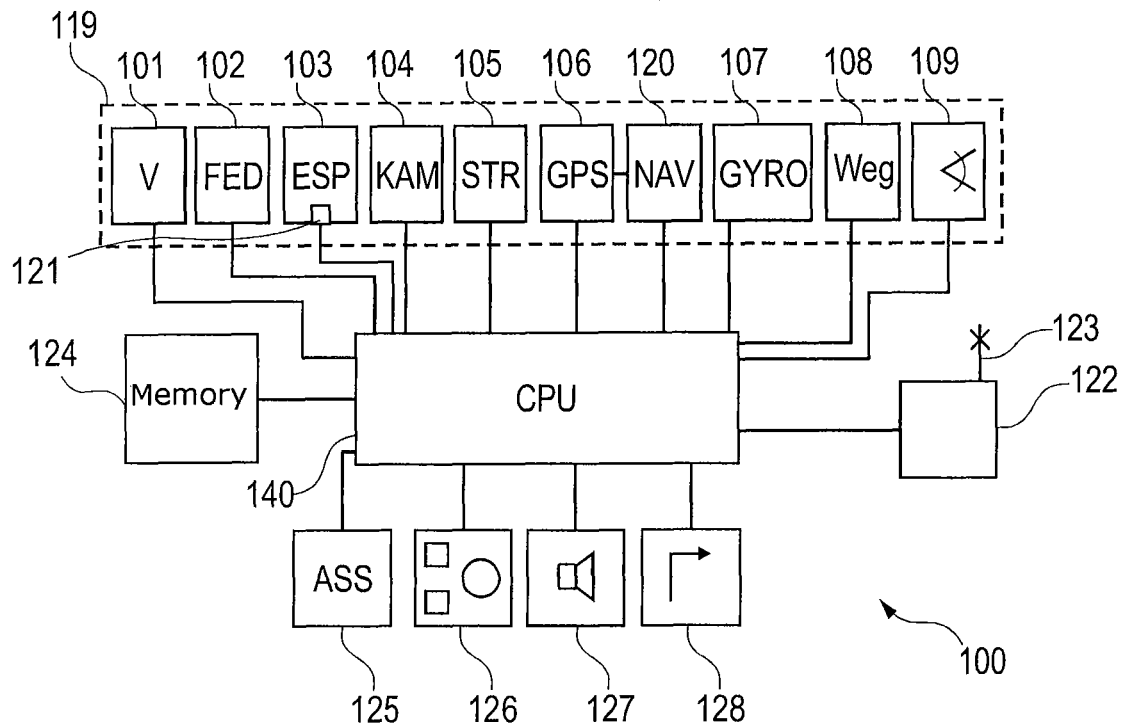
FIG. 1 shows an assistance system based on an exemplary embodiment of the invention.

The illustrations in the figures are schematic and not to scale.

In the description of the figures which follows, the same reference numerals are used for the same or similar elements.

FIG. 1 shows a schematic illustration of components of an assistance system 100 which is installed in a vehicle, for example. The assistance system 100 has a control unit 140, a communication unit 122 with an antenna 123 and has a restriction device 121.

The data to be transmitted, which are transmitted from the control unit 140, which is in the form of a CPU, for example, to the communication unit 122, are edited by means of the restriction device 121 prior to sending such that they can only be read by particular receivers.

Accordingly, the restriction device 121 is also used to accept received messages and to establish whether they are intended for the respective vehicle.

In this way, it is possible to allow vehicle-to-vehicle communication which is restricted to particular groups (e.g. to vehicles from one manufacturer, vehicles in a particular class, or a particular model of vehicle, etc.). For this purpose, the communication is encrypted by cryptographic methods. The necessary key is stored in vehicle components which cannot readily be replaced. By way of example, these are driving dynamics systems, such as ESP, EDS, ASR or ABS, which cannot readily be installed retrospectively and which are also not readily available separately (that is to say are not readily available on the "aftermarket").

This key also allows certain properties to be restricted to certain vehicles, such as emergency vehicles (rescue vehicles, etc.), vehicles for short-distance public transport, etc.

The restriction unit 121 can also be fitted directly between the communication unit 122 and the control unit 140. In that case, the key is still stored in another vehicle component, however. This variant is not shown for the sake of clarity.

The control unit 140 has an input unit 126 connected to it. The input unit 126 allows various adjustments to be made for the assistance system and possibly on a navigation unit 120 which is linked thereto.

In addition, a visual output unit in the form of a monitor 128 is provided which can be used to output routing information, for example, or else information regarding the group of vehicles which are involved. Furthermore, the routing information can also be output via the audible output unit 127. Output via the audible output unit 127 has the advantage that the driver is less distracted from what is currently happening in the traffic.

A memory element 124, which is connected to the control unit 140 or is integrated in the control unit 140, stores the digital map data (e.g. as navigation map data) in the form of data records. By way of example, the memory element 124 also stores additional information about traffic restrictions, infrastructure devices and the like in association with the data records.

In addition, a driver assistance unit 125 is provided which is supplied with the digital map data or with other information.

For the purpose of determining the current vehicle position, the assistance system 100 has a navigation unit 120 with a satellite navigation receiver 106 which is designed to receive positioning signals from Galileo-satellites or GPS satellites, for example. Naturally, the satellite navigation receiver 106 may also be designed for other satellite navigation systems.

The satellite navigation receiver 106 is connected to the control unit 140. The navigation unit 120 is also connected to the control unit 140. In addition, there is a direct connection between the navigation unit 120 and the satellite navigation receiver 106. It is thus possible for the GPS signals to be transmitted directly to the CPU 140.

Since the positioning signals cannot always be received in city centers, for example, the sensor system 119 of the assistance system 100 also has a direction sensor 107, a distance sensor 108, a steering wheel angle sensor 109, a spring excursion sensor 102, an ESP sensor system 103 and possibly an optical detector 104 for the purpose of performing compound navigation. It is also possible for a beam sensor 105 (radar sensor or lidar sensor) to be provided. In addition, the sensor system 119 has a speedometer 101.

The signals from the GPS receiver 106 and from the other sensors are handled in the control unit 140. The vehicle position ascertained from said signals is aligned with the roadmaps using map matching. The routing information obtained in this manner is finally output via the monitor 128.

Figure 2:
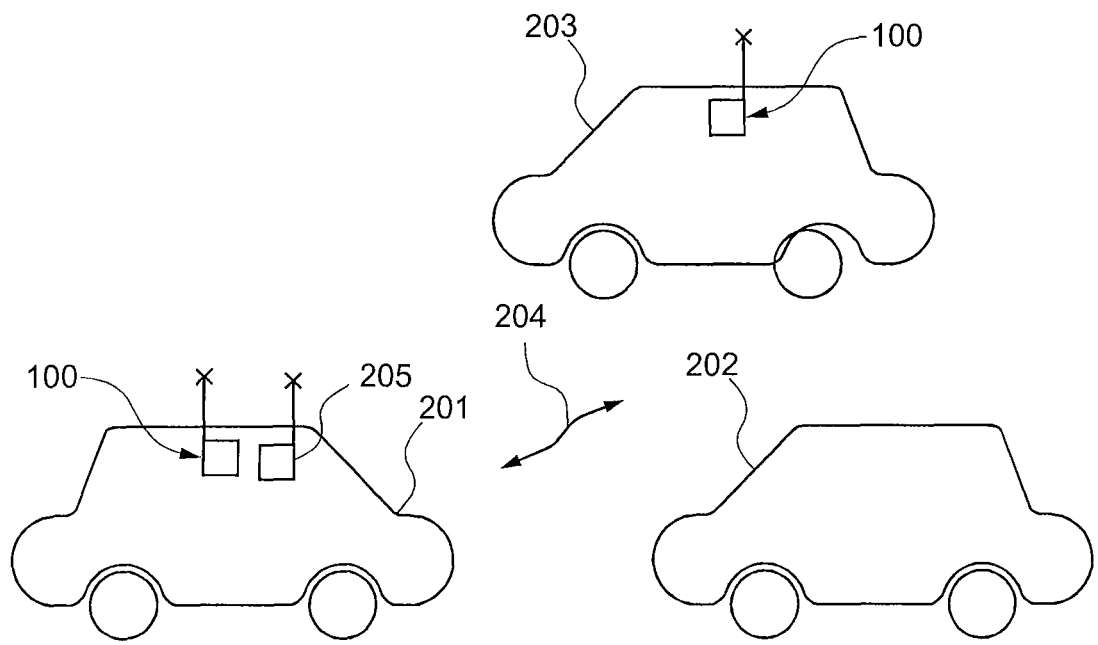
FIG. 2 shows a plurality of vehicles based on a further exemplary embodiment of the invention.

FIG. 2 shows a plurality of vehicles 201, 202, 203 which are respectively equipped with an assistance system 100. In addition, a mobile appliance 205 (mobile telephone, PDA, etc.) is provided which is carried in the vehicle 201. The three vehicles and the mobile appliance 205 can communicate with one another by means of a wireless communication link 204.

Only those vehicles which have an assistance system 100 can be involved in the communication. In addition, communication is possible only for those mobile appliances 205 which have suitable authentication, that is to say belong to a selected group. However, even if the vehicle has such an assistance system 100, it may be excluded from certain communication if it does not belong to a particular, selected group of vehicles.

This allows vehicle-to-vehicle communication and/or vehicle-to-mobile appliance communication which is restricted to particular groups and is accessible only to particular groups.

In other words, it is therefore possible to limit standardized communication techniques to a particular group of users.

The keys required for the communication are stored in the relevant vehicle component during the actual manufacture of the assistance system.

Figure 3:
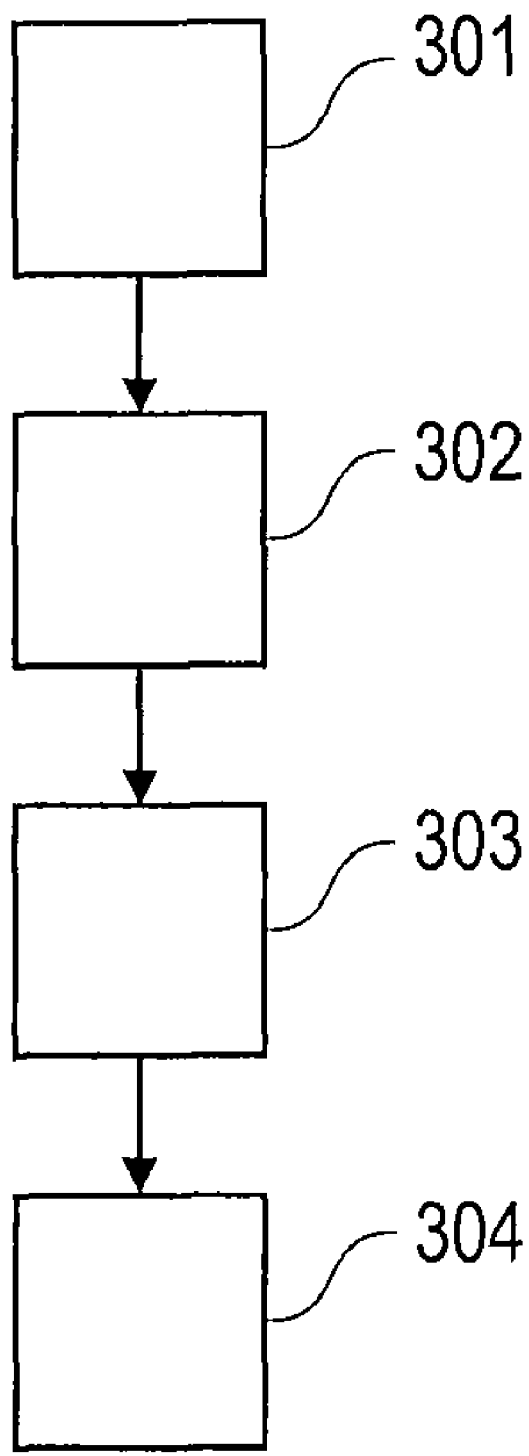
FIG. 3 shows a flowchart for a method based on a further exemplary embodiment of the invention.

FIG. 3 shows a flowchart for a method based on an exemplary embodiment of the invention. In step 301, an assistance system in a first vehicle encrypts a message which is to be transmitted using a key which is stored in an ESP controller. In step 302, the message is transmitted in the form of a broadcast and is received by a plurality of vehicles. In step 303, the message is decrypted by an assistance system in an adjacent vehicle using a key which is stored in an ESP controller. In step 304, the received and decrypted message is then forwarded, for example to the control unit 140.

In addition, it should be pointed out that "comprising" and "having" do not exclude other elements or steps, and "a" or "an" does not exclude a large number. Furthermore, it should be pointed out that features or steps which have been described with reference to one of the above exemplary embodiments can also be used in combination with other features or steps from other exemplary embodiments described above.

The invention claimed is:

1. An assistance system for a first vehicle, said assistance system having:
    a communication device for communication with selected transmission and reception devices in other selected vehicles in a group with the first vehicle;
    a restriction device for restricting the communication to the selected vehicles in the group using a cryptographic key;
    wherein the restriction device is integrated in an electronic vehicle component of the assistance system during manufacturing of the electronic vehicle component; and
    wherein the electronic vehicle component is a driving dynamic system of the first vehicle.

2. The assistance system as claimed in claim 1,
    wherein the selected transmission and reception devices are assistance systems which are arranged in vehicles proximate to the first vehicle.

3. The assistance system as claimed in claim 1,
    wherein the selected transmission and reception devices are a mobile communication appliance which is designed to support the assistance system.

4. The assistance system as claimed in claim 1,
    wherein the restriction device has an encryption device which is designed to encrypt data which are to be transmitted and to decrypt received data;

wherein keys required for the encryption and decryption are stored in the restriction device.

5. The assistance system as claimed in claim 4,
wherein the restriction device or the keys required for the encryption and decryption is/are integrated in an ESP controller or in a driver assistance unit.

6. The assistance system as claimed in claim 1,
wherein the vehicle component is a separate, standalone module.

7. The assistance system as claimed in claim 1,
wherein the assistance system has an input device which is usable to select the vehicles which are involved in the communication.

8. The assistance system as claimed in claim 7,
wherein the selected vehicles are vehicles from a particular manufacturer, vehicles in a particular class, or vehicles in a particular model.

9. The assistance system as claimed in claim 7,
wherein the selected vehicles are emergency vehicles, rescue vehicles, or are vehicles for short-distance public transport.

10. The assistance system as claimed in claim 1,
wherein the communication unit is designed for communication using Bluetooth, ZigBee, WLAN, WiMax, DSRC or cellular radio.

11. A vehicle having an assistance system as claimed in claim 1.

12. A method for identification-dependent communication between vehicles, said method having the following steps:
receiving, by a receiver of a first vehicle, data from a transmission and reception device in a second vehicle in a group with the first vehicle; and
restricting, by a restriction device in the first vehicle, communication between the first vehicle and the second vehicle by using a cryptographic key,
wherein the restriction device is integrated in an electronic driving dynamic system of the first vehicle during manufacturing of the electronic driving dynamic system.

13. A method for identification-dependent communication between a plurality of components of a vehicle, said method having the following steps:
receiving data encrypted by a cryptographic key sent by a transmitting electronic driving dynamic component in the vehicle by another electronic component in the vehicle; and
determining whether the transmitting component is a component which belongs to a group of selected components which are authorized for transmission based on the cryptographic key,
wherein the cryptographic key is integrated in the electronic driving dynamic component of the vehicle during manufacturing of the electronic driving dynamic component.

14. The method as claimed in claim 13, further comprising using a cryptographic method to determine whether the transmitting component is a component which belongs to a group of selected components which are authorized for transmission.

15. The method as claimed in claim 14, further comprising storing keys required for the cryptographic method in the vehicle component.

16. A non-transitory computer-readable medium which stores a program element which, when executed on a processor, instructs the processor to perform the following steps:
receiving, by a receiver of a first vehicle, data from a transmission and reception device in a second vehicle in a group with the first vehicle; and
restricting, by a restriction device in the first vehicle, communication between the first vehicle and the second vehicle by using a cryptographic key,
wherein the restriction device is integrated in an electronic driving dynamic system of the first vehicle during manufacturing of the electronic driving dynamic system.

* * * * *